United States Patent
Samson et al.

(10) Patent No.: US 7,581,129 B2
(45) Date of Patent: *Aug. 25, 2009

(54) DYNAMIC POWER CONTROL FOR REDUCED VOLTAGE LEVEL OF GRAPHICS CONTROLLER COMPONENT OF MEMORY CONTROLLER BASED ON ITS DEGREE OF IDLENESS

(75) Inventors: Eric C. Samson, Folsom, CA (US); Aditya Navale, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 285 days.

This patent is subject to a terminal disclaimer.

(21) Appl. No.: 11/747,392

(22) Filed: May 11, 2007

(65) Prior Publication Data
US 2007/0214289 A1    Sep. 13, 2007

Related U.S. Application Data

(63) Continuation of application No. 11/024,065, filed on Dec. 28, 2004, now Pat. No. 7,222,253.

(51) Int. Cl.
*G06F 1/32* (2006.01)
(52) U.S. Cl. .................................. 713/323; 713/320
(58) Field of Classification Search .............. 713/320, 713/323; 345/534
See application file for complete search history.

(56) References Cited

U.S. PATENT DOCUMENTS

| | | | |
|---|---|---|---|
| 5,629,715 A | 5/1997 | Zenda | |
| 5,835,435 A | 11/1998 | Bogin et al. | |
| 5,852,737 A | 12/1998 | Bikowsky | |
| 6,657,634 B1 | 12/2003 | Sinclair et al. | |
| 6,718,475 B2 | 4/2004 | Cai | |
| 6,785,829 B1 | 8/2004 | George et al. | |
| 6,820,209 B1 | 11/2004 | Culbert et al. | |
| 6,963,987 B1 | 11/2005 | Emons | |
| 6,971,034 B2 | 11/2005 | Samson et al. | |
| 6,983,384 B2 | 1/2006 | Iwaki | |
| 7,149,909 B2 | 12/2006 | Cui et al. | |
| 7,222,253 B2 * | 5/2007 | Samson et al. | 713/323 |
| 7,254,729 B2 * | 8/2007 | Matsushima et al. | 713/322 |
| 2003/0210247 A1 | 11/2003 | Cui et al. | |
| 2004/0139359 A1 | 7/2004 | Samson et al. | |
| 2004/0268168 A1 | 12/2004 | Stanley et al. | |

* cited by examiner

*Primary Examiner*—Chun Cao
(74) *Attorney, Agent, or Firm*—Buckley, Maschoff & Talwalkar LLC

(57) ABSTRACT

A method includes detecting a trigger condition, and in response to detecting the trigger condition, reducing a voltage applied to a graphics controller component of a memory controller. The reduction in voltage may cause the voltage to be reduced below a voltage level required to maintain context information in the graphics controller component.

19 Claims, 3 Drawing Sheets

DYNAMIC POWER CONTROL FOR REDUCED VOLTAGE LEVEL OF GRAPHICS CONTROLLER COMPONENT OF MEMORY CONTROLLER BASED ON ITS DEGREE OF IDLENESS

CROSS REFERENCE TO RELATED APPLICATION

The present application is a Continuation of U.S. Ser. No. 11/024,065, filed Dec. 28, 2004.

BACKGROUND

Computer systems are pervasive in industrialized societies, and include everything from small handheld electronic devices, such as personal data assistants and cellular telephones, to application-specific electronic devices, such as set-top boxes, digital cameras, and other consumer electronics, to medium-sized mobile systems such as notebook, sub-notebook and tablet computers, to desktop systems, workstations and servers.

In recent years there have been many advances in semiconductor technology that have resulted in the development of improved electronic devices having integrated circuits (ICs) operating at higher frequencies and supporting additional and/or enhanced features. While these advances have enabled hardware manufacturers to design and build faster and more sophisticated computer systems, the advances have also tended to bring the disadvantage of higher power consumption, particularly for battery-powered computer systems.

A number of techniques are known for reducing the power consumption in computer systems. For example, the Advanced Configuration and Power Interface (ACPI) Specification (Rev. 2.0c, Aug. 25, 2003) sets forth information about how to reduce the dynamic power consumption of portable and other computer systems. With respect to processors used in computer systems, four processor power consumption modes (C0, C1, C2 and C3) are defined in the ACPI Specification. For example, when a processor is executing instructions, it is in the C0 mode. The C0 mode is a high power consumption mode. When the processor is not executing instructions, it may be placed in one of the low power consumption modes C1, C2 or C3. An operating system (OS) in the computer system may dynamically transition the idle processor into the appropriate low power consumption mode.

The C1 power mode is the processor power-saving mode with the lowest latency. The C2 power mode offers improved power savings over the C1 power mode. In the C2 power mode, the processor is still able to maintain the context of the system caches. The C3 power mode offers still lower power consumption compared to the C1 and C2 power modes, but has higher exit latency than the C2 and C1 power modes.

While the reduced power consumption modes defined by the ACPI Specification and known techniques have many advantages, there is a continuing need to further reduce power consumption of computer systems. That need has been heightened by the migration of IC technology to sub-micron line widths, which has resulted in increasing possibilities for current leakage in ICs even during idle conditions.

DETAILED DESCRIPTION

Figure 1:
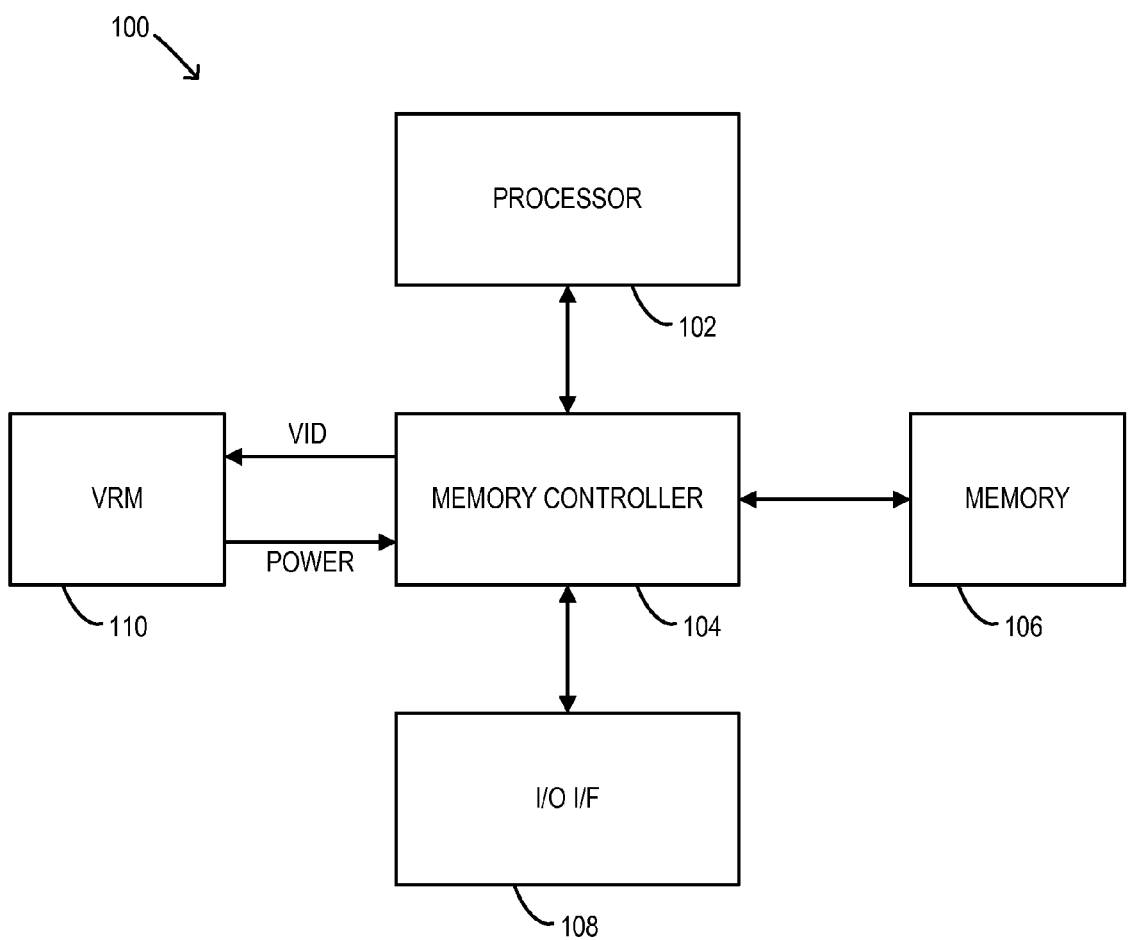
FIG. 1 is block diagram of a computer system provided according to some embodiments.

FIG. 1 is a block diagram of a computer system 100 provided according to some embodiments. The computer system 100 includes a processor 102 that may comprise the CPU (central processing unit) for the computer system 100. The processor 102 may be, for example, a microprocessor of a type conventionally employed in mobile computer systems such as notebook computers.

The computer system 100 further includes a memory controller chipset 104 that is coupled to the processor 102 to exchange data with the processor 102. The memory controller is coupled to one or more memory devices 106 and may control exchanging of data between the processor 102 and the memory device 106 in accordance with conventional practices. The memory controller also has integrated therein graphics controller circuitry which controls displaying of information on a display device (not shown) that is part of the computer system 100. The memory devices 106 are part of the computer system 100 and may be at least partly constituted, for example, by conventional double data rate random access memory (DDR RAM). The memory devices 106 may be referred to as a "graphics memory unit".

The computer system 100 also includes an input/output (I/O) interface 108 which the memory controller 104 couples to the processor 102. Exchanges of data between the processor and other system components (not shown) such as disk drives, communication ports and/or input/output devices may be handled via the memory controller 104 and the I/O interface 108.

In addition, the computer system 100 includes a voltage regulator module (VRM) 110. The VRM 110 is coupled to the memory controller 104 and receives from the memory controller 104 a data signal such as a voltage identification ("VID") signal. In response to the VID signal, the VRM 110 supplies power to the memory controller and/or to portions of the memory controller at a voltage level that complies with the value of the VID signal. Thus the memory controller 104 controls the voltage level of at least one power signal supplied to the memory controller 104 by the VRM 110. (Although not shown in the drawing, the computer system 100 may include one or more additional VRMs to provide regulated power to other system components such as the processor 102. The other VRMs may, for example, be controlled by an additional VID signal or signals output by the processor 102 or another system component.)

The computer system 100 may also include one or more clock generation circuits (not shown) which provide one or more clock signals to components of the computer system 100 such as the processor 102, the memory controller 104 and the memory devices 106.

Figure 2:
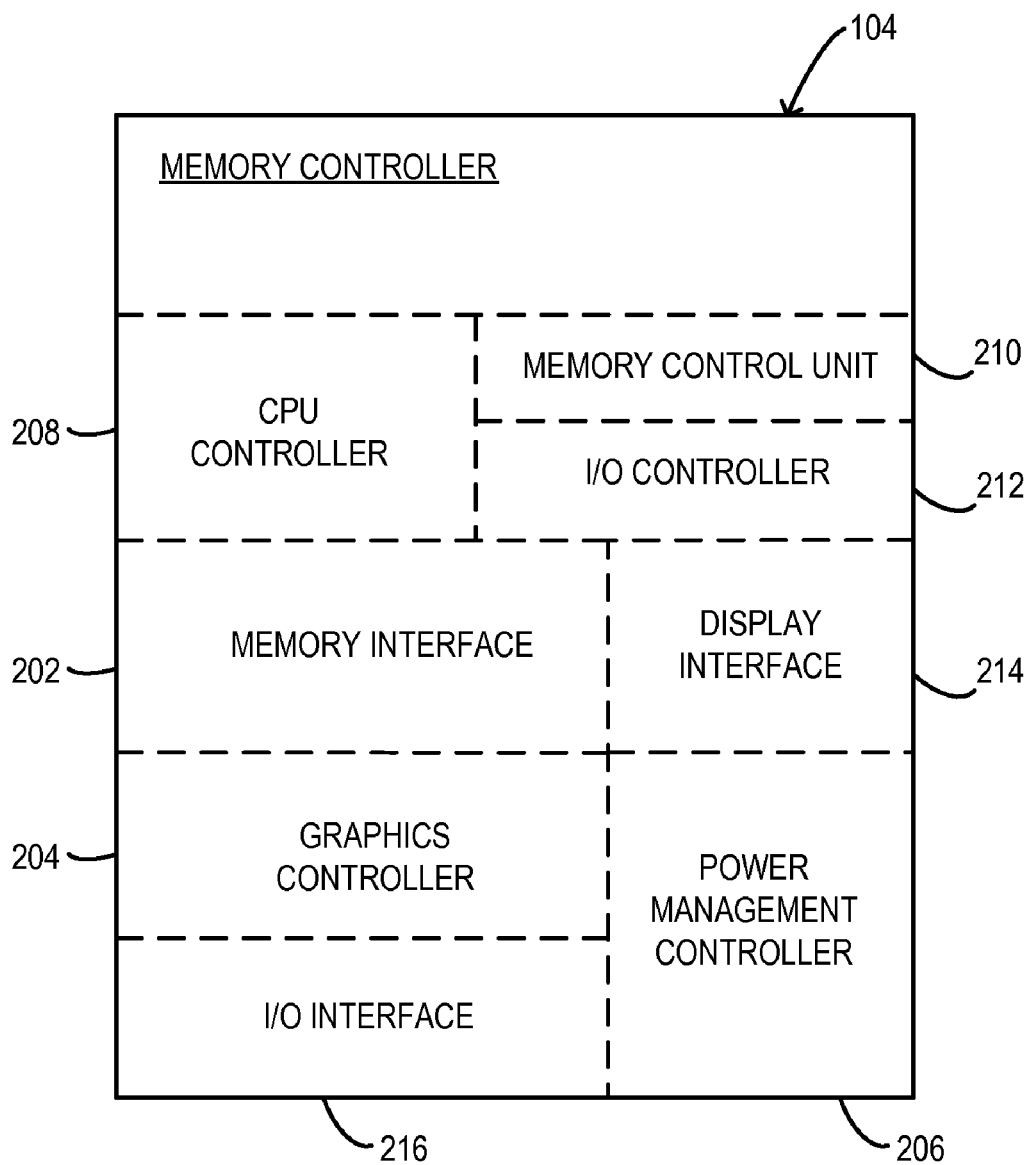
FIG. 2 is a high level block diagram of a memory controller chipset that is part of the computer system of FIG. 1.

FIG. 2 is a high level block diagram of memory controller 104. The memory controller 104 includes a memory interface component 202 which provides the interface between the processor 102 (FIG. 1) or any other component to the memory devices 106. The memory controller 104 also includes a graphics controller component 204 which controls displaying of information on a display unit (not shown) of the computer system 100. In addition, the memory controller 104 includes a power management controller 206 which may provide power management functions for the memory controller 104 in accordance with some embodiments.

The memory controller 104 may also include other components, which may be provided in accordance with conventional practices, such as a CPU controller 208, a memory control unit 210, an input/output controller 212, a display interface 214 and an input/output interface 216.

Figure 3:
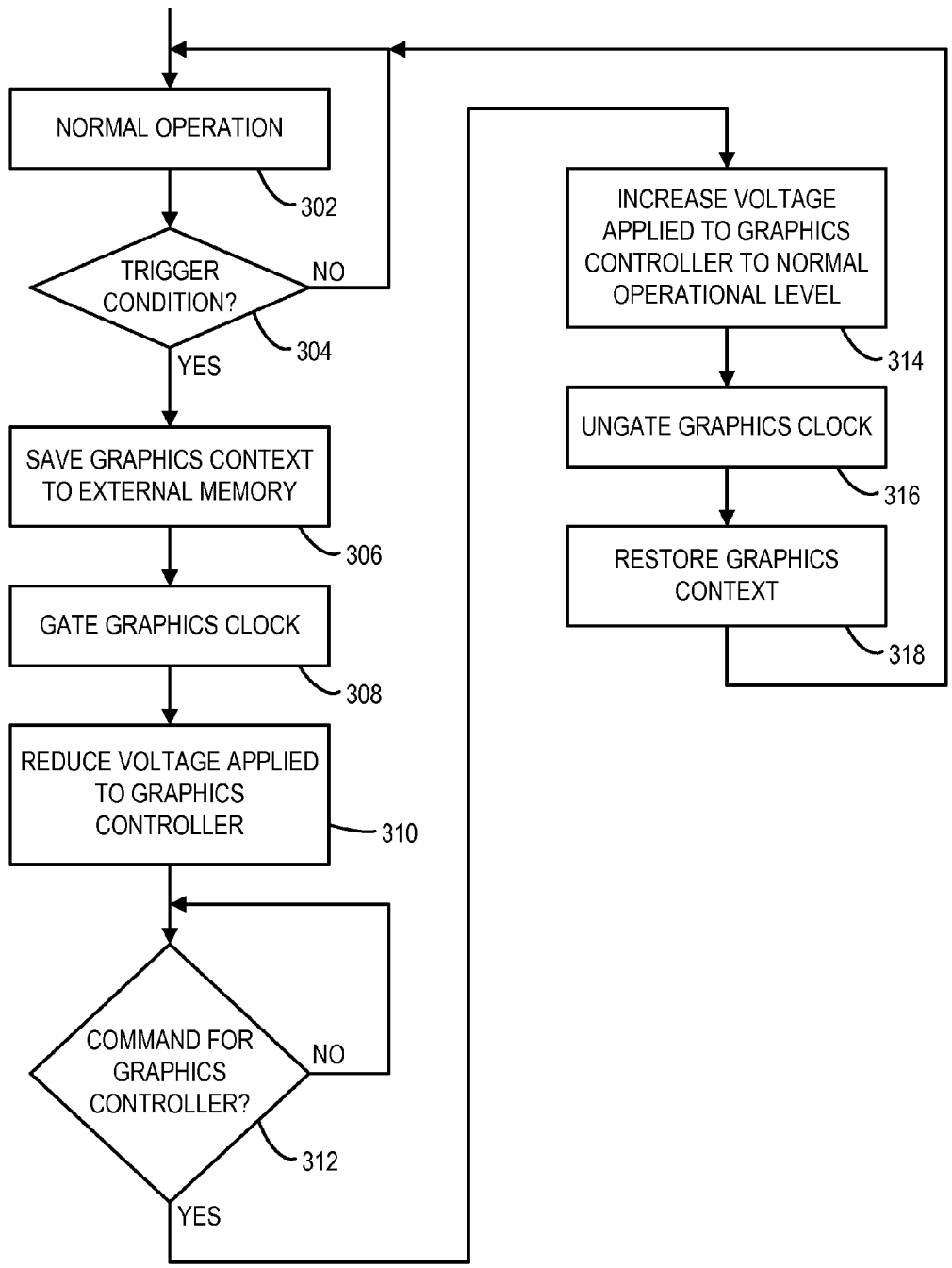
FIG. 3 is a flow chart that illustrates a process performed by the memory controller of FIG. 2 in accordance with some embodiments.

FIG. 3 is a flow chart that illustrates a process in accordance with some embodiments performed, at least in part, by the power management controller 206 of the memory controller 104.

Block 302 in FIG. 3 represents normal operation of the graphics controller component 204. For example, during normal operation the graphics controller component 204 may be performing operations in response to commands received from the processor 102. Also during normal operations, the VRM 110 may be supplying power to the graphics controller component 204 that is either at a suitable voltage level for maintaining full operations, or at least is at a voltage level that is high enough to allow the graphics controller component to maintain its context information.

At times during normal operation 302 (e.g., at regular time intervals) the power management controller 206 determines (as indicated by decision block 304) whether it has detected a "trigger condition". By "trigger condition" is meant one or more conditions and/or events which are suitable to trigger entry into a special low voltage power mode for the graphics controller component 204. For example, in some embodiments, a trigger condition may be a degree of idleness of the graphics controller component 204. For example, the degree of idleness of the graphics controller component 204 may be a condition of having been idle for more than a predetermined consecutive period of time (e.g., more than 200 microseconds). Thus the degree of idleness may be a predetermined duration of a period of idleness. As another example, the degree of idleness may be a condition of having been idle for a certain predetermined percentage or greater of time during a predetermined period of time. For example, the degree of idleness required to trigger the special low voltage power mode may be idleness during at least 80% of a given 100 microsecond period (e.g., in a moving window of 100 microseconds). Thus the degree of idleness required for a trigger event may be a proportion of time in an idle condition relative to a certain (previous) time period.

In other embodiments, the trigger condition may be a determination that the processor 102 has entered or is entering a process according to which the voltage supplied to the processor 102 is to be reduced and/or the processor is not requiring graphics processing. A command indicating such a process may be provided to the memory controller, and detection of such a command may be detection of a trigger event which launches a substantial voltage reduction for the graphics controller component of the memory controller.

In some embodiments, there may two or more different trigger conditions, the detection of any one of which may cause the power management controller 206 to initiate a substantial voltage reduction for the graphics controller component 204. In some embodiments, two or more different trigger conditions may need to be detected for the power management controller 206 to initiate the voltage reduction for the graphics controller component 204.

If a positive determination is made at 304 (i.e., if a trigger condition or a required combination of trigger conditions is detected), then the power management controller 206 causes (as indicated at 306) the context information in the graphics controller component to be stored in an external memory such as the memory device(s) 106 or other low power data storage device (which may be internal to the memory controller 104 in some embodiments). (By external memory is meant any memory device that is not part of the memory controller 104; the term "external memory" may include a memory device that is coupled to the memory controller 104.) As is familiar to those who are skilled in the art, the context information may have been stored in the graphics controller component 204 as internal states of registers and/or SRAM (static random access memory) that is included on the IC die (not separately shown) on which the graphics controller component 204 is formed. The context information may, for example, include information concerning one or more states of the graphics controller component 204 and/or information concerning a current configuration of display and/or graphics hardware (not shown) that is being controlled by the graphics controller component 204. In some embodiments, the bandwidth to the memory device(s) 106 from the memory controller 104 may be quite high so that the storing of the context information in the memory device(s) 106 may be performed quite rapidly. In some embodiments, a command or instruction to store the context information in this situation may be the same as a command or instruction conventionally employed to store context information in external memory as part of a context switching operation.

Next, at 308, the clock signal normally supplied to the graphics controller component 204 is gated off (disabled). Then, as indicated at 310, the power management controller 206 sends an updated VID signal to the VRM 110, or otherwise controls the VRM 110, so that the VRM 110 reduces the voltage level of the power supplied by the VRM 110 to the graphics controller component 204. The reduction of the voltage level at 310 may be such that the level of the voltage applied to the graphics controller component 204 is reduced below a voltage level that is required by the graphics controller component 204 to internally maintain the context information. In some embodiments, a normal operating voltage level may be about 1.0 V, and an approximate minimum voltage level required to internally maintain context information in the graphics controller component 204 may be about 0.7 V. The reduction in voltage at 310 may be to a level of 0.6 V or below.

The condition in which a reduced voltage is applied to the graphics controller component 204 of the memory controller 104 may persist for an indefinite period of time until it becomes necessary for the graphics controller component to "wake up". At a decision block 312 it is determined whether a command to be executed by the graphics controller component has been issued. (For example, such a command may be issued by the processor 102.) If a positive determination is made at 312 (i.e., if issuance of a command for the graphics controller component 204 is detected), then (as indicated at 314) the power management controller 206 updates the VID signal to the VRM 110, or otherwise controls the VRM 110, to increase the voltage applied by the VRM 110 to the graphics controller component 204. The increase in voltage may raise the applied voltage to a level which supports full operation of the graphics controller component 204.

Next, at 316, the power management controller 206 may ungate (re-enable) the clock signal for the graphics controller component 204. Then, at 318, the context information that was stored in the external memory at 306 may be fetched from external memory (e.g., memory device(s) 106) and transferred back to the graphics controller component 204 so that the context information is once again present in the graphics controller component 204. Normal operation 302 of the graphics controller component 204 may then resume (e.g. with execution of the command detected at 312) and may continue until another idle period and/or reduction in voltage is implemented for the graphics controller component 204.

The process described above is not meant to imply a fixed order of process stages, and the process may be performed in any order that is practicable. For example, in some embodiments, the clock signals for the graphics controller component 204 may be re-enabled before the voltage is increased.

With the process described above in connection with FIG. 3, the voltage applied to the graphics controller component 204 of the memory controller 104 may be reduced to very low levels on occasions when the reduction in voltage is unlikely to significantly disrupt operation of the computer system 100. The reduction in voltage may reduce current leakage in the graphic controller component 204 and may otherwise reduce average power consumption in the memory controller. This may be particularly advantageous in a mobile computer system, since the reduction in average power consumption may enhance the battery life of the mobile computer system.

As used in the appended claims, reducing (increasing) a voltage may include sending a signal to a VRM to cause the VRM to reduce (increase) the voltage level of a power signal output by the VRM. It should be understood that increasing a voltage may include increasing a voltage level from zero (i.e., turning on or re-enabling a voltage).

In some embodiments, during some idle periods of the graphics controller component 204 the voltage applied to the graphics controller component 204 may be reduced from the normal operating level (e.g., 1.0 V), or active stand-by voltage or turbo-mode voltage, to a reduced level (e.g., 0.8 V), i.e. a passive stand-by voltage that is still adequate to maintain the context information in the graphics controller component.

In some embodiments, the VR function may be integrated with the memory controller rather than being provided in a separate module.

In some embodiments, the power management controller 206 may control voltage to itself and may include a state machine that is operable at a reduced voltage to detect wake-up conditions.

In embodiments described above, the graphics controller component of the memory controller is caused to wake up from the reduced voltage state upon detection of a command to be executed by the graphics controller component. In addition or alternatively, the graphics controller component may be caused to wake up upon detecting that the processor 102 has initiated a memory mapped input/output (mmio) write operation to graphics registers (not separately shown).

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
   detecting a degree of idleness of a graphics controller component of a memory controller;
   in response to detecting the degree of idleness of said graphics controller component, storing, in an external memory, context information, said context information maintained in said graphics controller component prior to detecting the degree of idleness of said graphics controller component; and
   after storing said context information in said external memory, reducing a voltage applied to the graphics controller component of the memory controller, said reducing causing the voltage to be reduced below a voltage level required to maintain said context information in said graphics controller component.

2. The method of claim 1, further comprising:
   prior to said reducing and after said storing, disabling clock signals for said graphics controller component.

3. The method of claim 2, further comprising:
   after said reducing, detecting issuance of a command for said graphics controller component; and
   in response to detecting issuance of the command, increasing the voltage applied to the graphics controller component, said increasing causing the voltage to be increased to a voltage level required to support full operation of the graphics controller component.

4. The method of claim 3, further comprising:
   after said increasing, enabling the clock signals for said graphics controller component.

5. The method of claim 4, further comprising:
   after said enabling, transferring said context information from said external memory to said graphics controller component.

6. The method of claim 3, further comprising:
   enabling the clock signals for said graphics controller component after detecting issuance of said command and prior to said increasing.

7. The method of claim 1, wherein said degree of idleness is a proportion of time in an idle condition relative to a previous time period.

8. The method of claim 1, wherein said degree of idleness is a duration of a period of idleness.

9. An apparatus comprising a memory controller, the memory controller including a graphics controller component, and the memory controller also including a power management controller for controlling a supply of power for at least a portion of the memory controller, the power management controller operative to:
   detect a degree of idleness of the graphics controller component;
   in response to detecting the degree of idleness of said graphics controller component, store, in an external memory, context information, said context information maintained in said graphics controller component prior to detecting the degree of idleness of said graphics controller component; and
   after storing said context information in said external memory, reduce a voltage applied to the graphics controller component of a memory controller, said reducing causing the voltage to be reduced below a voltage level required to maintain said context information in said graphics controller component.

10. The apparatus of claim 9, wherein said power management controller is further operative to:
    prior to said reduction and after said storing, disable clock signals for said graphics controller component.

11. The apparatus of claim 10, wherein said power management controller is further operative to:
    after said reduction, detect issuance of a command for said graphics controller component; and
    in response to detecting issuance of the command, increase the voltage applied to the graphics controller component, said increase causing the voltage to be increased to a voltage level required to support full operation of the graphics controller component.

12. The apparatus of claim 11, wherein said power management controller is further operative to:
    after said increase, enable the clock signals for said graphics controller component.

13. The apparatus of claim 12, wherein said power management controller is further operative to:

after said enabling, transfer said context information from said external memory to said graphics controller component.

14. The apparatus of claim 11, wherein said power management controller is further operative to:

enable the clock signals for said graphics controller component after detecting issuance of said command and prior to said increasing.

15. The apparatus of claim 9, wherein said degree of idleness is a proportion of time in an idle condition relative to a previous time period.

16. The apparatus of claim 9, wherein said degree of idleness is a duration of a period of idleness.

17. A system comprising:

a memory controller; and a graphics memory unit in communication with the memory controller;

wherein the memory controller includes a graphics controller component, and the memory controller also includes a power management controller for controlling a supply of power for at least a portion of the memory controller, the power management controller operative to:

detect a degree of idleness of the graphics controller component;

in response to detecting the degree of idleness of said graphics controller component, store, in an external memory, context information, said context information maintained in said graphics controller component prior to detecting the degree of idleness of said graphics controller component; and after storing said context information in said external memory, reduce a voltage applied to the graphics controller component of a memory controller, said reducing causing the voltage to be reduced below a voltage level required to maintain said context information in said graphics controller component.

18. The system of claim 17, wherein said power management controller of the memory controller is further operative to:

prior to said reduction and after said storing, disable clock signals for said graphics controller component.

19. The system of claim 18, wherein said power management controller of the memory controller is further operative to:

after said reduction, detect issuance of a command for said graphics controller component; and in response to detecting issuance of the command, increase the voltage applied to the graphics controller component, said increase causing the voltage to be increased to a voltage level required to support full operation of the graphics controller component.

* * * * *